United States Patent [19]

Montigny

[11] 4,268,528
[45] May 19, 1981

[54] PREPARATION OF CHEESE FROM ULTRAFILTERED MILK

[75] Inventor: Jean Montigny, St. Hilaire Saint Mesmin, France

[73] Assignee: Harle & Lechopiez, France

[21] Appl. No.: 842,806

[22] Filed: Oct. 17, 1977

[30] Foreign Application Priority Data

Oct. 18, 1976 [FR] France .............................. 76 31257

[51] Int. Cl.$^3$ .............................................. A23C 19/02
[52] U.S. Cl. ....................................... 426/40; 426/36; 426/39
[58] Field of Search .............................. 426/36, 40, 39

[56] References Cited

U.S. PATENT DOCUMENTS

| | | | |
|---|---|---|---|
| 3,406,076 | 10/1968 | Little | 426/39 |
| 3,914,435 | 10/1975 | Maubois et al. | 426/36 X |
| 3,947,598 | 3/1976 | Stenne | 426/36 |
| 3,963,837 | 6/1976 | Maubois et al. | 426/40 |
| 4,018,752 | 4/1977 | Buhler et al. | 426/36 X |

FOREIGN PATENT DOCUMENTS

| | | |
|---|---|---|
| 2197521 | 3/1974 | France . |
| 2239208 | 2/1975 | France . |
| 2232999 | 2/1976 | France . |
| 1419056 | 12/1975 | United Kingdom . |
| 1445095 | 4/1976 | United Kingdom . |

OTHER PUBLICATIONS

Cottage Cheese Manufacture from Ultrafiltered Milk with Coagulation in Moulding Tubes, Derment Abstract 4, 811, 4w/29.

Maubois et al., Preparation of Cheese from Liquid Precheese Obtained by Ultrafiltration of Milk, Le Lait, vol. 51, 1971 (pp. 495-533).

*Primary Examiner*—David M. Naff
*Attorney, Agent, or Firm*—Oblon, Fisher, Spivak, McClelland & Maier

[57] ABSTRACT

Cheese is produced from ultrafiltered milk by a process wherein milk is acidified by lactic fermentation to a pH of about 4.4 or less to coagulate the milk and flocculate the casein therein, the acidified coagulated milk is ultrafiltered to produce a flowable acidified retentate, the acidified retentate is cooled to a temperature between 0° and 4° C. and stirred while avoiding foam production to deflocculate the casein, and the resultant retentate is converted into cheese by the action of rennet. Prior to converting the retentate into cheese, it may be mixed with an ultrafiltration retentate produced from sweet milk. The process permits accurate adjustment of the calcium content of the cheese being produced.

18 Claims, No Drawings

PREPARATION OF CHEESE FROM ULTRAFILTERED MILK

BACKGROUND OF THE INVENTION

1. Field of the Invention

The present invention relates to the treatment of milk intended to be subjected to ultrafiltration for the manufacture of cheeses. The invention relates in particular to a new dairy raw material utilisable for the manufacture of cheeses. The invention finds particularly interesting application in the treatment of milk intended to be subjected to ultrafiltration to serve as a raw material for the manufacture of fresh cheeses, soft chesses, pressed chesses, of the Saint Paulin type of similar cheeses. The invention also relates to the cheeses so obtained.

2. Description of the Prior Art

Cheese making tradition teaches that there exists a narrow relationship between the size and form of the cheese on the one hand and the characteristics which define its texture on the other hand. Independently of the fat content, as well as the surface or internal flora, the texture of a cheese depends on the plasticity and the structure of its paste.

The plasticity and the cohesion of a paste are strictly connected to its dryness and its composition, in particular with its content of alkaline-earth elements—calcium and magnesium—, these characteristics varying from one type of cheese to another.

However if the calcium is a determining element of the plasticity, resulting through its slight variations in important changes in flexibility and elasticity of the paste, its existence gives rise, in the presence of lactic acid in sufficient amount, to calcium lactate, which is a producer of bitterness.

The reduction in the level of calcium lactate in a cheese is achieved, in traditional manufacture, by two different routes the selection of which is determined by the criteria of whether the paste must or must not be flexible:

when the paste must preserve a sufficient level of calcium, there is an obligation to remove a maximum of lactose—potential lactic acid—by extended ripening of the curded grain, by washing the latter or by both at once.

When the paste must be further demineralised, the calcium becomes solubilised, as a result of the development of the acidity consequent upon lactic fermentation, and removed in the serum, so that the presence of lactose does not result in any drawback.

SUMMARY OF THE INVENTION

Calcium is present in milk and cheese paste in various combinations—carbonate, phosphate, citrate, lactate,——and as the case may be, in the state of dissociated salt, undissociated salt, although dissolved, or in the state of a complex salt with casein. The removal of the calcium in the form of lactate is all the greater as the acidity of the serum is higher. In fact, the complete solubilisation of the calcium, which is manifested by identical levels of calcium in the milk and in the serum exuding from the coagulum or present in the permeate of an ultrfiltration apparatus, is only obtained at an acidity higher than that corresponding to the isoelectric point of casein for example from 4.2 to 4.3 instead of 4.7.

When the ultrafiltration of the milk is proceeded with, the serum produced titrates approximately 0.4 g/l of calcium when the milk is sweet—pH 6.6 for example—while it shows a calcium content substantially equal to that of the milk from which it is derived, namely about 1.2 g/l, if the acidity is high—pH of the order of 4.3 for example.

The process, according to the invention, consists of conditioning before the ultrafiltration of the whole or a fraction of the milk, according to the manufacture concerned, so as to decalcify it to the maximum desired and if necessary to delactose it.

The advantage of the process according to the invention is to substitute for decalcification of the coagulum, which works during draining, a decalcification of the milk utilised which is more reliable since it can be extremely accurate. This process eliminates the continuing risk arising from the more or less rapid development of lactic fermentation, during draining, which development governs at the same time the calcium content and the final dryness of the cheese on emerging from the draining room.

GENERAL DESCRIPTION OF THE INVENTION

In its general form, the invention relates therefore to a process for producing a dairy raw material, useful notably in the manufacture of cheeses, said process calling upon ultrafiltration of acidified milk, with lowering of the temperature, and being characterised in that at least a fraction of the amount of milk required for the manufacture of the cheeses concerned is acidified to a pH of at least equal to about 4.4 or lower and in that the thus acidified milk is subjected to ultrafiltration, and further comprising at least one step of lowering the temperature of milk being processed, between 0° and 4° C., which leads to an ultrafiltration retentate constituting the desired raw material and adapted to be converted into cheese under the action of rennet, or other equivalent coagulating enzymes, permitting the renneting of the ultrafiltration retentate to be carried out in order to cause the casein to coagulate at said temperature situated between 0° and 4° C. or at a higher temperature.

In a modification of the process, ultrafiltered sweet milk may be added to the acidified retentate to produce a mixture retaining an acidified condition, the temperature of the mixture being adjusted to between 0° and 4° C., and then the mixture warmed and rennet added to the warmed mixture, or rennet may be added to the cooled mixture before warming.

The ultrafiltration is carried out preferably until the retentate possesses the desired dry extract and calcium content and corresponding to the cheese to be manufactured.

According to another aspect of the invention, it relates also by way of novel industrial product, to the dairy raw material produced by the above-defined process.

It will be noted that, according to an important feature of the invention, the process calls first upon a lactic fermentation of the milk in the course of ultrafiltration, but that, for the transformation, to cheeses proper, there must always be utilised an enzyme adapted to coagulate the casein of the pre-cheese.

In the sense of the present description, such an enzyme is rennet or other equivalent coagulating enzyme. The process according to the invention is well adapted to cheese manufacture. It combines the acidification of the milk and the cooling of the retentate under well determined conditions: pH of the acidified milk below the isoelectric point of casein, that is to say, pH beyond 4.4 and temperature of the retentate being adjusted to between 0° and 4° C., with, complementarily and necessarily, the transformation into cheese of the retentate by renneting the latter.

Thus, the pH of the milk is brought beyond the isoelectric of the casein, coagulating the milk and flocculating the casein therein so that the calcium complexed with the latter is gradually solubilised progressively with the lowering of the pH. The thus acidified milk is subjected to ultrafiltration. If the pH has been lowered to 4.3, the calcium concentration of the ultrafiltrate is as high as the milk from which it is derived.

When the level of calcium contained in the retentate taking into account the concentration to be reached, is judged sufficient, the ultrafiltration may be interrupted. The manufacture of fresh pastes necessitates a concentration varying from 2.5 to 4. The concentration is higher for other cheeses.

The invention takes advantage of an original property of casein. The latter, in fact, is distinguished from other proteins not only by the fact that it does not coagulate under the effect of heat, but also by its inaptitude to floculate at a temperature comprised between 0° and 4° C., whatever the reaction of the medium in which it is suspended, and even if this reaction is that of its isoelectric point which is situated at pH 4.7.

The invention also takes advantage of another property of casein, that of coagulating under the action of rennet, at a relatively low temperature below 4° C., for example at +2° C. if the acidity is sufficiently high. It seems that the blocking of the coagulation by the low temperature is annuled by the high acidity.

The process according to the invention enables the calcium content of the fabricated cheese to be adjusted accurately. This factor has a considerable importance on the final dryness of the cheese, all things being otherwise equal, in particular the renneting temperature, the quality and the dose of rennet, the initial acidity of the milk used, as well as that developed consequent upon lactic fermentation, the mechanical working accompanying the molding, the temperature of the draining room and the other usual factors of cheese manufacture.

A curd ceases to drain, if its dry extract reaches a value related to its calcium content. For example, a curd does not drain further even though it has a dry extract of 38%, if its calcium content is of the order of 1.8 g/kg, while a curd containing 4 g/kg of calcium will continue to exsude serum if it shows, for the same fat level, a dry extract of 40%.

In the process according to the invention, it is possible to use a milk derived from any milk-giving female animal, cow, sheep, goat, ass, buffalo, etc. In the same way, it is possible to resort to raw, pasteurised, whole, fully or partially skimmed, milk, whether previously concentrated or not, etc. In order to effect at the same time a reduction in the calcium content in the retentate and a reduction in the proportion of lactose with respect to the other elements of the cheese, the retentate is diluted with water or with an aqueous solution, in the course of ultrafiltration. Preferably the dilution of the retentate with water or with an aqueous salt solution is effected at the end of the ultrafiltration.

The invention can include two modifications: one involving artificial acidification and the other natural acidification. The latter is much preferred in practice and will hence be the only one described in the following.

For natural acidification, recourse is had to lactic fermentation to acidify all or part of the milk which is to be subjected to the ultrafiltration. This fermentation will be carried out as far as possible at a temperature close to that to which cheese technology normally resorts.

It would also appear preferable, although not imperative, to utilise a milk having the required fat content for the manufacture envisaged, rather than to proceed, after ultrafiltration of a skimmed milk, with mixing the retentate and the corresponding cream which, with the fat, introduces non-concentrated skimmed milk. The level of concentration to be obtained is hence lower by resorting to a fatty milk than in starting from a skimmed milk whose retentate must then be enriched.

It is also observed that in the case of slow coagulation-manufacture of fresh cheese-it is desirable, without this being an obligation, to procede with homogenisation of the fat, in the form of cream to enrich the skimmed milk before pasteurisation so as to avoid any separation of the fat during the setting of the pre-cheese.

The practical conditions in which the process according to the invention are applied depend upon the ultrafiltration equipment available as well as on the types of cheeses to be manufactured.

When the ultrafiltration equipment permits a high speed of circulation of the milk over the membranes, in particular a speed higher than 3 m/s, the ultrafiltration can be conducted at a temperature which can go up to 50° C., subject to the consequences that this can entrain from the organoleptic point of view. It has been observed in fact that the heating of floculated casein has practically no effect on the subsequent fluidification of the retentate when the ultrafiltration has terminated.

In equipment with a high speed of circulation, the ultrafiltration yield obtained with milk previously coagulated by acidification is very satisfactory. This must be attributed probably to the fact that, in the coagulated milk, the serum is already separate from the floculated casein, so that the separation of the constitutents of the milk by ultrafiltration works more easily.

In the case of the use only of ultrafiltration modules permitting a moderate flow speed, in particular below 3 m/s, or when the concentration must be considerable and the viscosity of the retentate becomes too high in equipment permitting a high flow speed, excessive pressures develop on the membranes; the fluidification of the milk utilised or of the very viscous retentate is obligatory before or in the course of ultrafiltration, and will be described below in more detail.

To obtain satisfactory yields, it is preferable to conduct the ultrafiltration of the coagulated milk up to its termination and only to fluidise the retentate subsequently. This preferred embodiments of the invention will now be illustrated in its application to the manufacture of fresh cheeses and soft cheese.

DESCRIPTION OF PREFERRED EMBODIMENT

Manufacture of fresh cheeses

In order to obtain fresh cheeses, the process is characterised:

in that the milk utilised is coagulated by lactic fermentation, at the usual temperature in this field, generally from 16° to 18° C., until the production of an acidity at least equal to 90 degrees Dornic, for a pH close to 4.3, in that the milk thus coagulated is ultrafiltered at a temperature below or equal to the renneting temperature but above 4° C., said temperature capable of being between 10° and 12° C., the ultrafiltration being conducted until the retentate has the desired dry extract, corresponding to the cheeses to be manufactured, in that the retentate thus obtained is fluidised by cooling it protected from air, to avoid any foam formation at a temperature comprised between 0° and 4° C., for example 2° C., in that rennet is added to the thus cooled retentate or pre-cheese, the addition being carried out at a temperature comprised between 0° and 4° C., and in that the thus renneted pre-cheese is then left to warm up gradually, once the setting of the latter has commenced.

As has been previously indicated, it is preferable to start with a milk having a fat content corresponding substantially to the richness that the manufacturer proposes to have in the cheese. It can be also be advantageous here to homogenise the fat in the form of cream before adding it to the milk. The conditions under which the ultrafiltration is carried out are similar to those which have already described in the specialised literature. The dairymen, skilled in the art, hence possess all the necessary bibliographical references in this respect. Reference may be made to recent works of F. Kosikowski "Cheese and fermented milk foods", Edward Brothers USA, Second edition (1977) and R. MADSEN "Hyperfiltration and ultrafiltration is plate-and-frame systems" (1977). It has been observed according to the invention that ultrafiltration of the coagulated milk works under extremely satisfactory conditions and with a high yield in ultrafiltration equipment with a high speed of circulation.

The fluidification of the retentate is produced by cooling, for example to a temperature of 2° C., while effecting stirring of said retentate protected from air in order to avoid foam formation.

It should be noted that once the renneting has been carried out and setting commenced, the temperature to which the pre-cheese is brought after coagulation, conditions the firmness of the curd and the "body of the fresh paste". These operations are carried out either in dosed molds whose shape and size correspond to those of the desired cheese, or in bulk if it relates to fresh paste to be subsequently packaged in conventional manner.

Once the setting has ended, the finishing operations are carried out in accordance with traditional techniques. If the fresh paste has been placed in a mold, unmolding of the cheeses follows and they are then sorted, then successively placed in the cheese drying room and in the cellar, to await their development, as is practiced currently for the manufacture of cheeses called Neufchatel, Olivet, Dreux, and similar fresh cheeses. Where fresh pastes in bulk are concerned, it suffices to stir the curd to obtain a fine and unctuous paste before packaging in accordance with known technology to obtain Swiss, demi-Swiss, demi-sel cheeses, diet cheese, herb cheeses, cream heart etc.

Manufacture of long-lasting fresh cheese

According to a modification, the process according to the invention also enables fresh cheeses to be obtained permitting long preservation. According to such an embodiment, after ultrafiltration of the coagulated milk, the retentate is subjected to a treatment called ultrahigh temperature (UHT) in the course of which it is brought to a temperature of 140° C. to 150° C. for some seconds, for example for 1 second, after which the thus heat-treated retentate is immediately homogenised and cooled to 70° C., as is already practised in equipment which enables UHT sterilisation of the milk. However, in the case of the invention, the cooling is pursued so that the retentate finally reaches a temperature of 0° to 4° C., in particular 2° C. Of course, all these operations must be carried out under fully aseptic conditions.

Due to the cooling which is carried out in accordance with the teachings of the present invention, the casein is defloculated and occurs in the retentate in the suspended state. The homogenised retentate is cooled and sterile rennet is added, for example, in the proportion of 10 to 20 ml per hundred liters of retentate, then conditioned aseptically in sterile commercial packages. The dairy raw material thus obtained by the invention constitutes a true pre-cheese, conditioned between 0° and 4° C., for example at 2° C. This pre-cheese is kept in a cooled container for a sufficient time for the rennet to exert its coagulating effect and convert it into cheese. The hardening will be developed when the cheese has returned to ordinary temperature.

The unctuous and fine texture of the paste will be obtainable by shaking the commercial containers holding the cheese either by the cheese maker at the end of manufacture, or by the consumer, at the time of use.

Manufacture of cheeses other then fresh cheese, in particular soft cheeses

It is another object of the invention to provide a process for producing cheeses by passing through an ultrafiltration retentate of the possibly acidified milk, characterised in that a first ultrafiltration retentate is prepared starting from normal milk and a second ultrafiltration retentate by starting from an acidified milk, the casein then occuring in floculated state in said second retentate, the amount of acidified milk representing a fraction of the total amount of the milk required for the manufacture of the cheeses concerned, and the amount of normal milk representing the complement of the total amount, and in that the first and the second retentate are mixed in proportions corresponding to the characteristics of the final cheese to be manufactured, which thus leads to a pre-cheese, in that the pre-cheese is cooled to a temperature between 0° and 4° C., which has the effect of resuspending the floculated casein of the second retentate and thus rendering it subsequently coagulable under the effect of rennet, in that to the pre-cheese, after allowing it to warm up, is added an enzyme such as rennet capable of coagulating the casein and in that the desired cheeses are then produced by conventional means of the art according to the type of the cheese.

Such a process can be advantageously used for the manufacture of soft cheeses, pressed cheeses, of the Saint Paulin type, or similar cheeses.

The amount of acid retentate to be incorporated in the mixture will be lower for cheeses of the Saint Paulin type than for cheeses of the Camembert type.

For the manufacture of soft cheeses, for example, only a part of the amount of the milk which is required for the manufacture of the cheeses concerned is acidified. According to the invention, in fact, two retentates are then prepared: one resulting from the ultrafiltration of the sweet milk and the other obtained by the ultrafiltration of the same milk but previously acidified by lactic fermentation. Then, in suitable proportions and at a temperature below 4° C., the two retentates obtained are mixed, to obtain a pre-cheese having the characteristics corresponding to those of the cheese to be manufactured. The raw material resulting from mixing the two retentates is renneted at a temperature not involving lactic flocculation of the casein, generally below the conventional temperature.

Then the pre-cheese is run into closed molds and, once setting has occurred, the cheeses are unmolded in traditional manner.

Thus, as has been previously indicated, it is advantageous to start from a milk having the required fat content and corresponding to that of the soft cheese which has to be manufactured.

The first retentate derived from ultrafiltration of the milk which has not been subjected to prior acidification, has a maximum calcium content. It is possible, as has been mentioned in the preamble, to subject it to a more or less extensive delactosing step by wetting the retentate before the end of the ultrafiltration operation. The second retentate, obtained after ultrafiltration of the same milk previously acidified by lactic fermentation, has a reduced calcium content. It should be recalled that prior lactic fermentation of the milk is carried out at a temperature in the vicinity of that of the milk utilised during traditional cheese manufacture.

The mixing of the two above defined retentates must be done in suitable proportions to obtain a pre-cheese possessing the characteristics corresponding to those of the type of cheese which has to be manufactured.

The principal factors which should be adjusted, apart from the fat content which is fixed by that of the milk utilised, are dryness at the end of draining, as well as the richness in calcium and magnesium of the final cheese. For example, for a Camembert paste, a 38 to 68% dry extract should be obtained for a final calcium content of 1.8 to 2 g per kilogram.

In general, if delactosing of the sweet retentate is not practised, a part of the retentate resulting from the ultrafiltration of sweet milk is used for 2 to 3 parts of the retentate obtained by ultrafiltration of the same milk previously acidified by lactic fermentation. The proportions to be retained depend also on the concentration level of each of the two retentates.

The mixture of the two retentates is then cooled to a temperature comprised between 0° and 4° C. The floculated casein of the acid retentate is resuspended and recovers its coagulability under the effect of the rennet, which corresponds to the essential characteristic of the invention. The fluidised mixture naturally has an acid reaction which varies according to the proportion of the two retentates. In the case of cheeses of the Camembert type, the pH of the mixture will generally vary between 4.9 and 5.0.

To manufacture cheeses from the pre-cheese according to the invention, it suffices to rennet the latter after heating to a temperature compatible with the casein, generally below the usual renneting temperature. Rennet maybe added prior to heating. The operations of running into molds, molding, setting, unmolding and the like are carried out according to traditional cheese making practice.

It has also been noted that a milk acidified by lactic fermentation—generally up to 90° Dornic—, then subjected under normal conditions, to ultrafiltration, is exceptionnally unsusceptible to contamination, whether the ultrafiltration temperature is less than 4° C. or reaches 30° or 40° C. This property is very advantageous from the hygienic point of view in the course of the application of the process of the invention.

ILLUSTRATION OF PREFERRED EMBODIMENTS

The present invention will be illustrated without being limited in any way by the following examples.

EXAMPLE 1

Manufacture of fresh cheeses

A test on fatty milk was carried out with a pilot plant including is series—1×8—namely 8 cylindrical ABCOR membranes—membranes each measuring 25 mm diameter, 1500 mm in length—, an apparatus supplied by a gear pump for recycling the retentate, operating at a maximum flow rate of 4800 l/h.

The test may be summarised as follows:

| - milk utilised: | |
|---|---|
| inital volume | 100 l |
| fat-free dry extract | 93 g/l |
| fat content | 36.6 g/l |
| calcium content | 1.28 g/l |
| acidity (degrees Dornic) | 92° D |
| pH | 4.30 |
| - operation of ultrafiltration: | |
| duration: | 14 hours | temperature of the milk maintained during the operation: 12° C.

| serum: | time (hours) | volume passed through | dry extract | nitrogeous material | calcium content | pH |
|---|---|---|---|---|---|---|
| | 1 | 8.5 l | 63g/l | 2.3g/l | 1.16g/l | 4.32 |
| | 2 | 16.5 l | 63g/l | 2.3g/l | 1.18g/l | |
| | 3 | 23.5 l | | | 1.18g/l | |
| | 4 | 28.8 l | | | 1.20g/l | |
| | 9 | 47.6 l | | | | |
| | 10 | 50.8 l | | | | |
| | 11 | 53.3 l | | | | |
| | 12 | 55.6 l | | | | |
| | 13 | 57.7 l | | | | |
| | 14 | 59.7 l | 61g/l | 2.2g/l | 1.22g/l | 4.35 |
| retentate: | | | | | | |
| | dry extract | | 23.5% | | | |
| | fat to dry material | | 38.8% | | | |
| | calcium content | | 1.08g/l | | | |

EXAMPLE 2

A test similar to example 1 was carried out in order to prepare cheeses of the Neufchatel type,—packages having a height of 60 mm and a diameter of 45 mm.

This test was on 200 l of milk having

| a fat free extract of | 94.0 g/l |
|---|---|
| a fat content of | 43 g/l |
| calcium content of | 1.20 g/l |
| pH, after lactic acidification of | 4.52 |

The same ultrafiltration module as previously was used, the membranes being however combined in a different way—4×2 instead of 1×8—, the module operating at a temperature of 20° C. to bring the concentration of the milk from 1 to 3.3 and then to 4° C. to bring this concentration from 3.3 to 4.3 and terminating by renneting at 2° C., in the proportion of 40 ml of rennet to 1/15,000$^e$ to 100l, before distribution into suitable sealed molds, of a pre-cheese having the following characteristics:

| | |
|---|---|
| dry extract | 39.4% |
| fat to dry material | 49.2% |
| calium content | 0.88 g/l |

The results obtained in examples 1 and 2 provided fresh cheeses having organoleptic qualities comparable in all respects to those of similar cheeses manufactured by conventional cheese making art.

EXAMPLE 3

Manufacture of soft cheeses

Tests were carried out with the same ABCOR module mentioned in Examples 1 and 2, but of which the 8 membranes were arranged differently, in four pairs of 2 membranes 4×2. The module was connected to a gear pump capable of a flow rate of 13,000 l/h.

In a typical test, which lasted more that 24 h, 175 l of milk, previously acidified by lactic fermentation, titrating 44 g/l of fat were brought to a quarter of the initial volume, carrying out the ultrafiltration at 28° C. to a concentration of 3.2, then, to terminate, to a quarter of the volume utilised at a temperature in the vicinity of 4° C., and this in order to fluidise the retentate and thus maintaining it at the pressure acceptable for the membraneless than 5 bars.

The ultrafiltration being terminated, the retentate of the acidified milk—pH 4.33, was mixed with a retentate of the same un-acidified milk—pH 6.54—previously obtained by concentration to a fifth on the same ultrafiltration module, in the proportion of 2.9 l of acid retentate per 1.1 l of sweet retentate.

The pre-cheese thus obtained had the following characteristics:

| | |
|---|---|
| dry extract | 39.1% |
| fat to dry matter | 48.3% |
| calcium content | 1.8 g/l |
| pH | 4.96 |

Stirred and brought for a sufficient time to 2° C. to ensure complete defloculation of the casein, the pre-cheese was reheated to 25° C. and, after having added rennet at 1/15,000$^e$ in the proportion of 40 ml per 100 l, it was distributed in molds having the sizes of Camemberts, where it coagulated.

The Camembert cheeses thus obtained had excellent organoleptic properties.

I claim:

1. Process for producing an acidified partially decalcified dairy raw material useful in the manufacture of cheeses from a starting milk which comprises the steps of:
   (1) Coagulating the starting milk and flocculating the casein therein by acidifying the milk by lactic fermentation to a pH of about 4.4 or less
   (2) Ultrafiltering the acidified coagulated milk to produce a flowable acidified retentate which contains the flocculated casein and whose dry extract corresponds to that of the cheese to be made, and
   (3) Cooling the retentate after step (2) to a temperature between 0° and 4° C. and stirring the same while avoiding foam production to deflocculate the flocculated casein in said acidified retentate to produce a starting milk suitable for coagulation with rennet to produce cheese.

2. Process according to claim 1, wherein the milk used is derived from a milk giving female, cow, sheep, goat, ass, or buffalo.

3. A process according to claim 1, wherein the milk used is a raw or pasteurized milk, whole milk or wholly or partly skimmed milk, or concentrated milk.

4. Process according to claim 1, wherein, in order to effect at the same time a reduction in the calcium content in the retentate and a reduction in the proportion of lactose with respect to the other elements of the retentate, the retentate is diluted with water or with an aqueous salt solution, in the course of ultrafiltration.

5. Process according to claim 4, wherein the dilution of the retentate with water or with an aqueous salt solution is effected at the end of the ultrafiltration.

6. Process according to claim 1, wherein said acidifying is done at a temperature suitable for the growth of lactic fermentation bacteria.

7. Process according to claim 1, wherein a starting milk is selected having a fat content required for the manufacture of the cheeses being produced.

8. Process according to claim 7, wherein, the fat content of the starting milk is adjusted by adding homogenized cream.

9. Process according to claim 1, wherein the ultrafiltration is carried out by circulating the milk over membranes at high speeds above 3 m/s, at a temperature no greater than 50 degrees C.

10. Process according to claim 1 comprising the additional steps of adding rennet to the cooled retentate of step (3) containing the deflocculated casein and allowing the retentate to coagulate.

11. The process of claim 1 wherein there is added to the product of step (2) a sweet ultrafiltration retentate prepared by ultrafiltering a sweet milk and the product so obtained is subjected to step (3).

12. The process of claim 4 wherein there is added to the product of step (2) a sweet ultrafiltration retentate prepared by ultrafiltering a sweet milk and the product so obtained is subjected to step (3).

13. As a novel industrial product, the dairy raw material for the manufacture of cheeses, which is the product of the process according to claim 1.

14. Process for producing cheeses comprising (a) preparing a first sweet ultrafiltration retentate, starting from normal sweet milk, by ultrafiltering said sweet milk, and (b) a second ultrafiltration retentate by ultrafiltering acid coagulated milk acidified to pH of about 4.4 or less by lactic fermentation, the casin being in the flocculated state in said acidified milk in said second retentate, the amount of acidified milk representing a fraction of the total amount of milk required for the manufacture of the cheeses concerned, and the amount of sweet milk representing the complement of this total amount, (c) mixing the first and the second retentate in proportions corresponding to the characteristics of the final cheese to be manufactured to produce a mixture termed a pre-cheese, the dry extract of the pre-cheese corresponding to that of the cheese to be made, (d) cooling the pre-cheese to a temperature between 0° and 4° C. and stirring the mixture, thereby resuspending the flocculated casein of the second retentate and thus rendering it subsequently coagulable under the effect of rennet, (e) warming the product of step (d) to above 4° C., (f) adding rennet to coagulate the casin and then (g) permitting the pre-cheese to coagulate.

15. Process according to claim 11, wherein the acidified milk subjected to ultrafiltration is acidified by lactic fermentation to a pH of about 4.3.

16. Process according to claim 11, wherein, to manufacture cheeses of the Camembert type, one part of the retentate resulting from the ultrafiltration of the sweet milk is mixed with 2 to 3 parts of the retentate obtained by ultrafiltration of the same milk previously acidified by lactic fermentation.

17. Process for producing cheese which comprises the steps of:
 (1) Coagulating a sweet starting milk and flocculating the casein therein by acidifying the milk by lactic fermentation to a pH of about 4.4 or less,
 (2) Ultrafiltering the acidified coagulated milk to produce a flowable acidified retentate, containing the flocculated casein,
 (3) Adding liquid ultrafiltered sweet milk retentate to the retentate produced in step (2) at the termination of the step to produce a mixture containing said flocculated casein, the dry extract of the mixture corresponding to the cheese to be made,
 (4) Cooling the mixture to a temperature between 0° and 4° C. and stirring the same, to deflocculate the flocculated casein in said mixture,
 (5) Renneting the mixture produced in step (4)
 (6) Heating the mixture obtained in step 5 to a temperature above 4° C. suitable for setting of the mixture to produce cheese,
 (7) transferring the heated mixture into sealed molds and permitting the mixture to set and form cheese, and
 (8) Unmolding the cheese from step 7.

18. Process for the manufacture of fresh cheese from a starting milk which comprises the steps of:
 (1) Coagulating said milk to produce a coagulated milk by lactic fermentation at a temperature of from about 16° to 18° C., until there is produced an acidity at least equal to 90 degrees Dornic, for a pH about 4.3, the casein in said coagulated milk being in flocculated condition,
 (2) Ultrafiltering the coagulated milk at a temperature between about 10° and 12° C., the ultrafiltering being conducted until the retentate has a dry extract corresponding to the cheese to be manufactured,
 (3) Cooling the retentate thus obtained which contains the flocculated casein with stirring, while protected from air to avoid any foam formation, at a temperature between about 0° and 4° C. to defloc- culate the flocculated casein therein,
 (4) Adding rennet to the retentate obtained from step (3), the addition being carried out at a temperature between about 0° and 4° C. in order to set the retentate, and then
 (5) Allowing the renneted retentate, once the setting has commenced, to reheat gradually to above 4° C.

* * * * *

UNITED STATES PATENT AND TRADEMARK OFFICE
CERTIFICATE OF CORRECTION

PATENT NO. : 4,268,528
DATED : May 19, 1981
INVENTOR(S) : Jean Montigny

It is certified that error appears in the above—identified patent and that said Letters Patent is hereby corrected as shown below:

Title page, first column, line 7, after "Assignee:"
    delete "Harle & Lechopiez, France" and insert
-- Centrale Laitiere de Haute Normandie, France --.

Signed and Sealed this

Twenty-fourth Day of November 1981

[SEAL]

*Attest:*

*Attesting Officer*

GERALD J. MOSSINGHOFF

*Commissioner of Patents and Trademarks*